(12) United States Patent
Wu (10) Patent No.: US 11,270,109 B2
(45) Date of Patent: Mar. 8, 2022

(54) INTERACTIVE METHOD AND INTERACTIVE SYSTEM FOR SMART WATCH

(71) Applicant: SHENZHEN UNIVERSITY, Shenzhen (CN)

(72) Inventor: Kaishun Wu, Shenzhen (CN)

(73) Assignee: SHENZHEN UNNERSITY, Shenzhen (CN)

( * ) Notice: Subject to any disclaimer, the term of this patent is extended or adjusted under 35 U.S.C. 154(b) by 215 days.

(21) Appl. No.: 16/731,042

(22) Filed: Dec. 31, 2019

(65) Prior Publication Data

US 2020/0226369 A1 Jul. 16, 2020

Related U.S. Application Data

(63) Continuation-in-part of application No. PCT/CN2019/070413, filed on Jan. 4, 2019.

(51) Int. Cl.
*G06K 9/00* (2006.01)
*G06K 9/62* (2006.01)

(52) U.S. Cl.
CPC ....... *G06K 9/00536* (2013.01); *G06K 9/6223* (2013.01); *G06K 9/6256* (2013.01); *G06K 9/6276* (2013.01)

(58) Field of Classification Search
CPC ... A61B 5/1116; A61B 5/1121; A61B 5/1123; A61B 5/681; A61B 5/6824; A61B 5/7246; A61B 5/7267; A61B 2503/10; A61B 2562/0219; G16H 50/70; A63B 24/0062; A63B 71/0619; A63B 2220/40; A63B 2220/44; A63B 2220/836; A63B 2024/0068; A63B 2230/62; A63B 2244/20

See application file for complete search history.

(56) References Cited

U.S. PATENT DOCUMENTS

| 2012/0319940 | A1 | 12/2012 | Bress et al. | |
|---|---|---|---|---|
| 2016/0051169 | A1* | 2/2016 | Hong | A61B 5/7405 600/595 |
| 2016/0256116 | A1* | 9/2016 | Baik | A61B 5/0059 |

FOREIGN PATENT DOCUMENTS

| CN | 103543826 A | 1/2014 |
|---|---|---|
| CN | 105353881 A | 2/2016 |
| CN | 106237604 A | 12/2016 |

(Continued)

*Primary Examiner* — Peet Dhillon
(74) *Attorney, Agent, or Firm* — Bayramoglu Law Offices LLC (57) ABSTRACT

An interactive method of a smart watch includes the following steps: S1. acquiring a vibration signal of an accelerometer and a gyroscope of a smart watch based on a vibration signal transmitted by a human body; S2. identifying the vibration signal by using an anomaly detection algorithm; S3. pre-processing the vibration signal, and further classifying and identifying the vibration signal by using an improved algorithm of a k-nearest neighbor algorithm; S4. analyzing the user's feedback on the results and correcting them in time to maintain a stable identification accuracy. The present disclosure also discloses an interactive system, including a signal detection module, an identification and classification module, and a real-time feedback module. In the present disclosure, the human body part is regarded as a virtual screen based on the vibration signal transmitted by the human body.

15 Claims, 10 Drawing Sheets

(56) References Cited

FOREIGN PATENT DOCUMENTS

| | | | |
|---|---|---|---|
| CN | 106919958 A | 7/2017 | |
| CN | 107329682 A | 11/2017 | |
| CN | 108292167 A | 7/2018 | |
| WO | WO-2018005933 A1 * | 1/2018 | ............. G06K 9/628 |

* cited by examiner

INTERACTIVE METHOD AND INTERACTIVE SYSTEM FOR SMART WATCH

CROSS REFERENCE TO THE RELATED APPLICATIONS

This application is the continuation-in-part application of International Application No. PCT/CN2019/070413, filed on Jan. 4, 2019, the entire contents of which are incorporated herein by reference.

TECHNICAL FIELD

The present disclosure relates to the field of interactive mode of a smart device, in particular to an interactive method and an interactive system based on a smart watch.

BACKGROUND

At present, the market of wearable smart devices is booming, among which the smart watches are especially prevalent. However, the smart watch is worn on the wrist and cannot be assembled with a large enough screen. Thus, unlike on mobile phone, the user fails to input words on smart watches. The existing smart watches mainly include three types of input modes: single-touch screen, finger tracking and speech recognition. The methods of single-touch screen and finger tracking are limited by the screen, while speech recognition is more limited by information sensitivity. In order to overcome the difficulty in inputting, many scientific research teams have also conducted researches. Nonetheless, the additional equipment is generally required, which is not widely accepted due to the cost of the additional equipment and the cost of learning.

SUMMARY

In order to overcome the above-mentioned technical problems, the present disclosure provides an interactive method and an interactive system for a smart watch based on a vibration signal transmitted by a human body. In the premise of conforming to the usage habit of the user, the new interactive modes for smart watches are developed to solve the problem lacking in the interactive means of the smart watch. The technical solutions of the present disclosure are as follows:

An interactive method of a smart watch, including the following steps:

S1. acquiring a vibration signal of an accelerometer and a gyroscope of a smart watch based on a vibration signal transmitted by a human body;

S2. identifying the vibration signal by using an anomaly detection algorithm;

S3. pre-processing the vibration signal, and further classifying and identifying the vibration signal by using an improved algorithm of a k-nearest neighbor algorithm;

S4. analyzing the user's feedback on the classification and identification results and correcting the results in time to maintain a stable identification accuracy.

Further, the vibration signals of X, Y, and Z axes of the accelerometer and the gyroscope are separately collected.

Further, the step S2 of identifying the signal by using the anomaly detection algorithm includes the following steps:

S21. collecting data of a Z axis of the accelerometer;

S22. filtering the data of the Z axis of the accelerometer by using a high-pass filter;

S23. setting a threshold of an effective tapping signal and a threshold of a noise signal;

S24. reading a signal having a smaller amplitude than the threshold of the noise signal as a first state;

S25. continue monitoring, waiting to read a signal having a larger amplitude than the threshold of the effective tapping signal, setting a position of the signal having the larger amplitude than the threshold of the effective tapping signal to be X, and setting a starting position of the signal to be X-L, namely, a position at a length L before the position X;

S26. continue monitoring, waiting to read a continuous signal having a smaller amplitude than the threshold of the noise signal, and setting an end position of the signal as a current position when the continuous amplitude is smaller than the threshold of the noise signal;

S27. obtaining signal through the starting position and the end position of the signal, judging whether a length of the signal is within the length range, and if not, returning to the step S25, otherwise proceeding to the step S28;

S28. performing a high-pass filtering on the signal, calculating energy of first m points and energy of points after a $m^{th}$ point of the signal after filtering respectively, judging whether the amplitude of the signal is greater than a threshold of a signal-to-noise ratio, if yes, determining the signal as a valid signal, otherwise determining the signal as a noise signal, and returning to the step S25.

Further, the step S3 includes the following steps:

S31. pre-processing the signal by normalization, subtracting a mean value from the signal and dividing the signal by a variance;

S32. in the initialization training model phase, storing the signal processed in the step S31 as a training sample in a database; in the actual use phase, classifying and identifying the signal by using the improved algorithm based on the k-nearest neighbor algorithm.

Further, the improved algorithm of the k-nearest neighbor algorithm is as follows: based on a dynamic time warping algorithm, matching an actual signal and a training signal in units of frame, and calculating a shortest Manhattan distance between the actual signal and the training signal, and using the shortest Manhattan distance as a basis for the k-nearest neighbor algorithm for classification and identification.

Further, the step S4 includes the following steps:

S41. after collecting the classification result obtained in the step S32, correcting an input result of the user;

S42. after correction, correcting the training sample to a certain extent, so as to keep the accuracy stable.

Further, in the step S41, the classification and identification result in the step 32 is corrected by providing a candidate key or by a correlation result in an input method.

Further, the step S42 specifically includes the following steps:

S421. when the correction result is identical to the classification result, performing no operation;

S422. when the correction result is not identical to the classification result, for the training sample having the same category as the classification result, deleting a sample having a largest distance calculated by the improved algorithm of the k-nearest neighbor algorithm, and replacing the deleted sample with a corrected training sample.

An interactive system of a smart watch, including:

a signal detection module, acquiring a vibration signal of an accelerometer and a gyroscope of a smart watch based on a vibration signal transmitted by a human body;

an identification and classification module, configured to identify the vibration signal by using the anomaly detection algorithm to pre-process the vibration signal, and further classify and identify the vibration signal by using the improved k-nearest neighbor algorithm to;

a real-time feedback module, analyzing the user's feedback on the results and correct the results in time to keep an identification accuracy stable.

A program, performing the interactive method of the smart watch of the present disclosure.

Compared with the prior art, the advantages of the present disclosure are as follows: in the present disclosure, the human body part such as the back of the hand is regarded as a virtual screen based on the vibration signal transmitted by the human body, and the improved machine learning algorithm is combined to actually expand the interactive means of the watch and to improve the user experience. The interactive means of the present disclosure is novel and interesting, can effectively meet the needs of users, and can be widely applied to the text input, the games in watches and the like.

DETAILED DESCRIPTION OF THE EMBODIMENTS

In order to clearly illustrate the objectives, technical solution and advantages of the present disclosure, the present disclosure is further described in detail in combination with the drawings and embodiments. It is understood that the specific embodiments described herein are merely intended to illustrate the present disclosure rather than limiting the present disclosure.

The preferred embodiments of the present disclosure are further specified hereinafter with the drawings.

Figure 1:
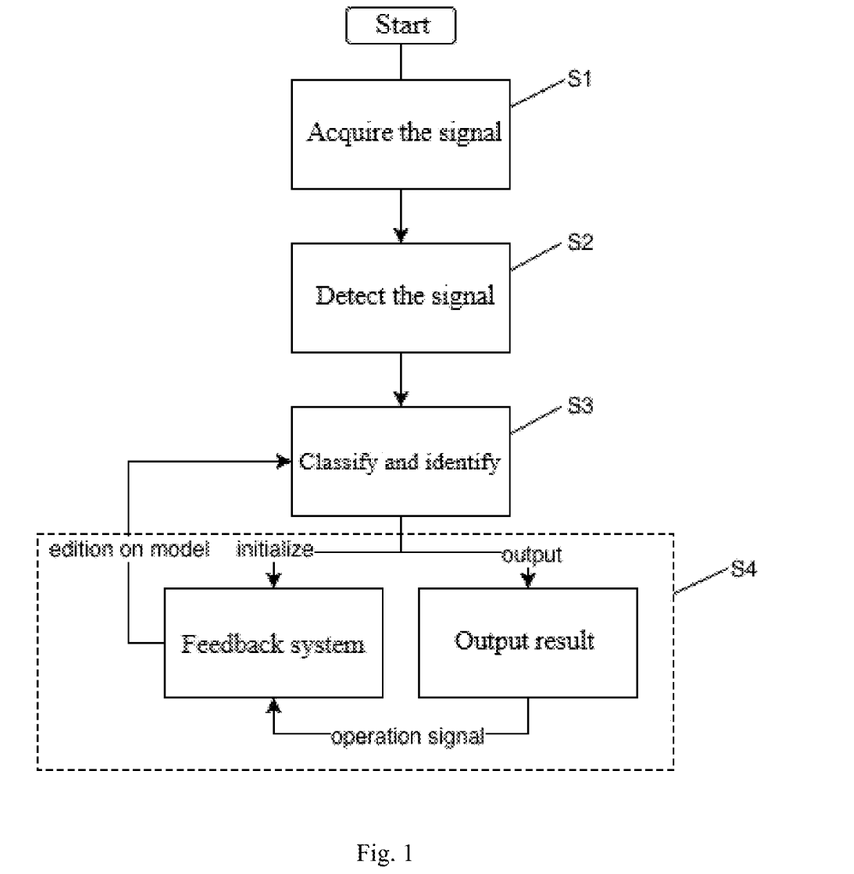
FIG. 1 is a flow chart of an interaction method of the present disclosure.

The present disclosure discloses an interactive method and an interactive system of a smart watch based on a human body-transmitted vibration signal and machine learning. As presented in FIG. 1, the interactive method of the present disclosure includes the following steps:

S1: based on a human body transmitted vibration signal, an accelerometer and a gyroscope of a smart watch are controlled by a program to collect vibration signals of the accelerometer and the gyroscope of the smart watch.

Specifically, the vibration signals of the X, Y, and Z axes of the accelerometer and the gyroscope are separately collected.

S2: the vibration signals are identified by an anomaly detection algorithm;

S3: the vibration signals are pre-processed, and the vibration signals are further classified and identified by an algorithm improved from a k-nearest neighbor algorithm;

S4. the user's feedback on the results is analyzed, and the results are corrected in time to keep an identification accuracy stable.

Figure 2:
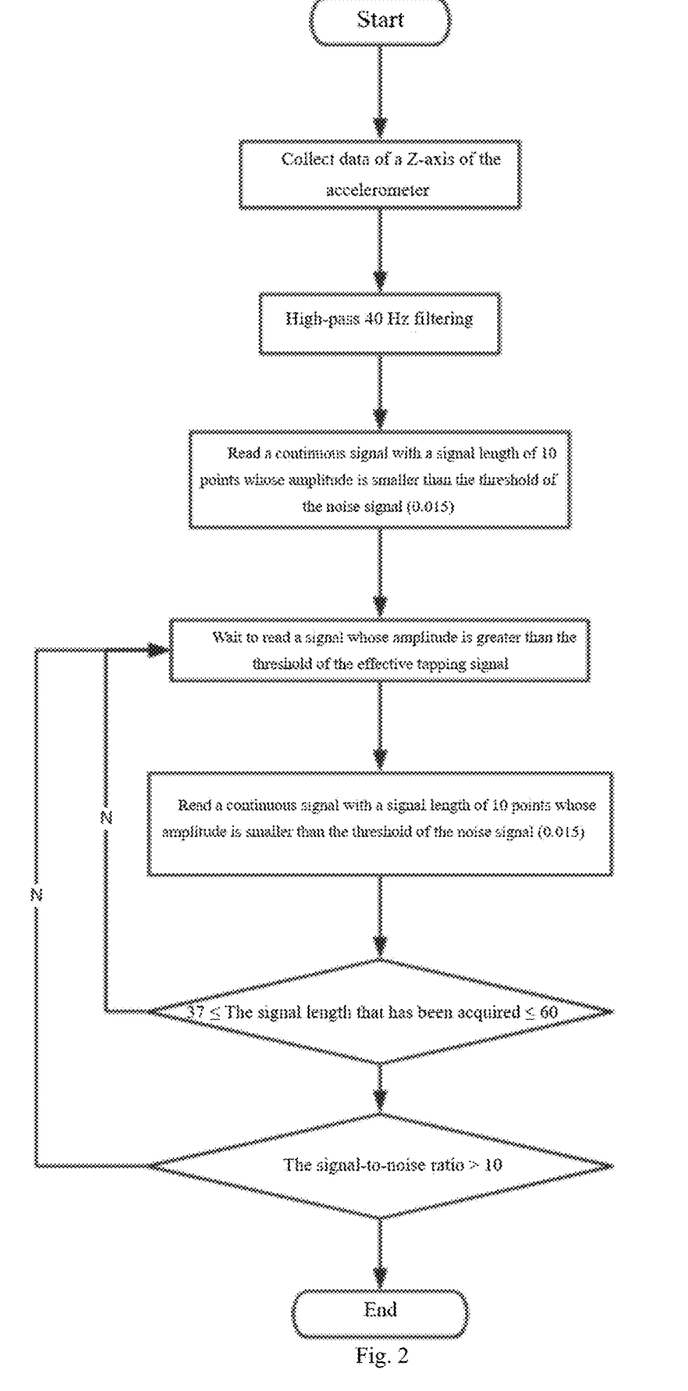
FIG. 2 is an operation flow chart of a detection signal module of the present disclosure.

As shown in FIG. 2, the step S2 of using an anomaly detection algorithm to identify the signals includes the following specific steps:

Firstly, the data of a Z-axis of the accelerometer is collected. An infinite impulse response (IIR) filter is used to filter the data. The signal sampling point after filtering is detected. When 10 signal sampling points having a signal intensity/amplitude smaller than the threshold (0.015) of the noise signal is continuously detected, a detection signal status is conducted/started. When a signal sampling point having a signal intensity/amplitude larger than the threshold of the signal is detected, the present signal sampling point is marked as x. Meanwhile, i signal sampling points before x is collected to form parts of the signal, namely the $(x-i)^{th}$ signal sampling points is the initial point of the tapping signal. In the tapping signal detection status, when 10 signal sampling points having a signal intensity/amplitude smaller than the threshold (0.15) of the noise signal is continuously detected, the detection tapping signal status is finished to return to the sampling sequence, namely the tapping signal sample. The ratio of the energy of the first m signal sampling points and the energy of the rest of the signal sampling points, namely the signal-to-noise ratio, is calculated. When the signal-to-noise ratio is larger than a threshold (10.0), the sampling sequence/signal is determined to be the tapping signal.

In this embodiment, in the step S3, the vibration signal is pre-processed, and the vibration signal is further classified and identified by using an improved algorithm of the k-nearest neighbor algorithm. The specific steps are as follows:

Firstly, the vibration signals of the X, Y and Z axes of the accelerometer and the gyroscope of each sample are spliced according to the categories of the sensor. The data of the X, Y and Z axes of the corresponding sensor are integratedly normalized. Specifically, the mean value of the data is subtracted from the data, and then the data are divided by the variance of the data. Then, in the initialization training model phase, the normalized data is stored as a training sample in the database, and in the actual use phase, the signal is classified and identified by using the improved algorithm based on the k-nearest neighbor algorithm. Specifically, based on the dynamic time warping algorithm, the distance between the test/input sample and the training sample is calculated, and the classification result is given according to the distance.

Wherein, the dynamic time warping algorithm is based on the dynamic plan. The dynamic time warping object is expanded from the original one-dimensional point to the three-dimensional (three axes) frame and the distance between each other is calculated, which can more accurately evaluate the similarity of two signals. Meanwhile, the algorithm allows the frame length and frame shift to be adjusted according to the actual sampling frequency and the demand, so as to reduce the power consumption of the algorithm, and to obtain the desired performance. The problem of failing to compare due to the timing misalignment between two signals is resolved, and the difference between the two signals are quantified. The distance is not limited to a Manhattan distance or an Euler distance.

Figure 5A:
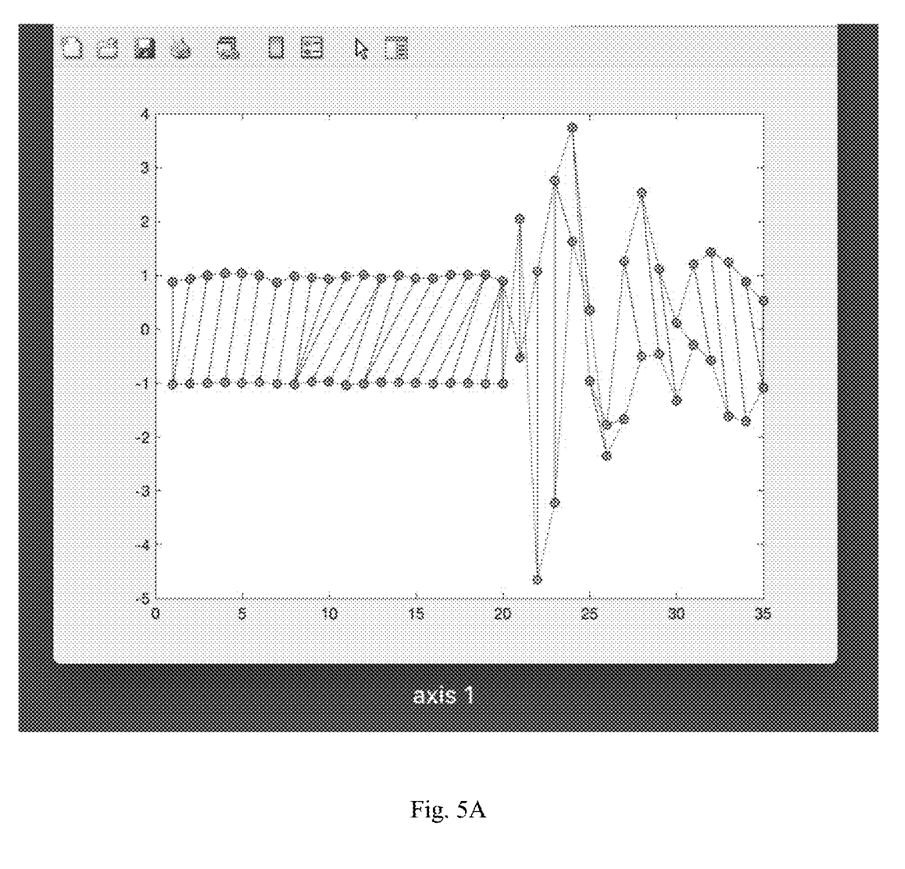
FIGS. 5A-5C are a signal matching result of an original dynamic time warping algorithm of the present disclosure.
Figure 5B:
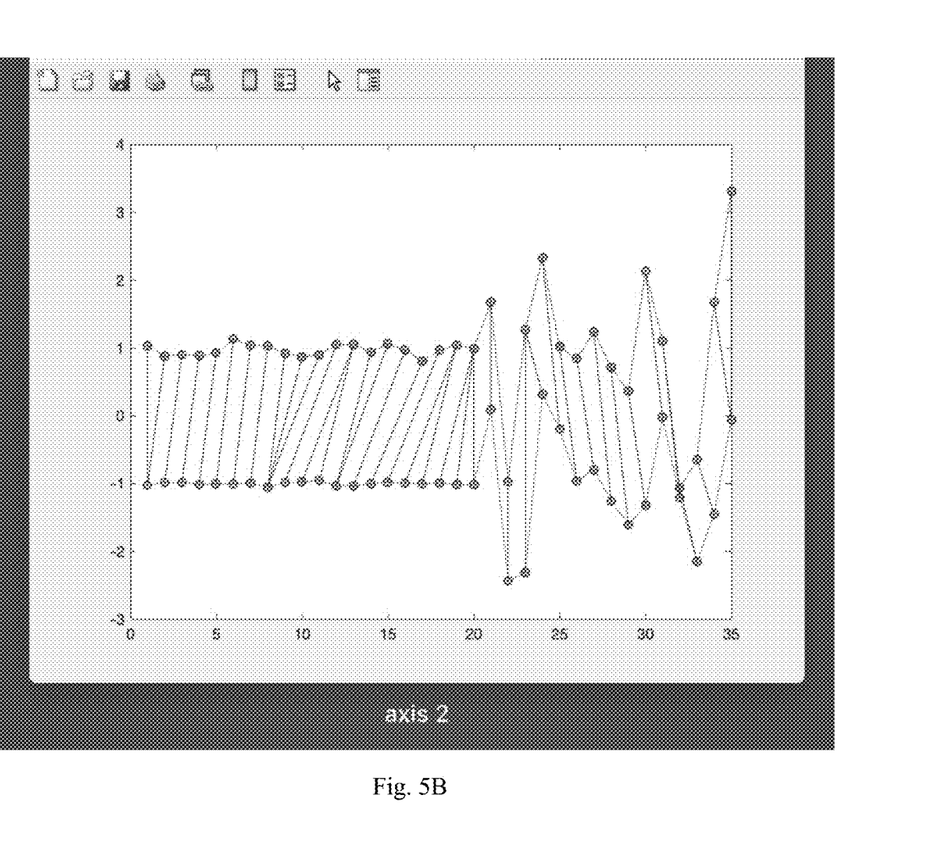
Figure 5C:
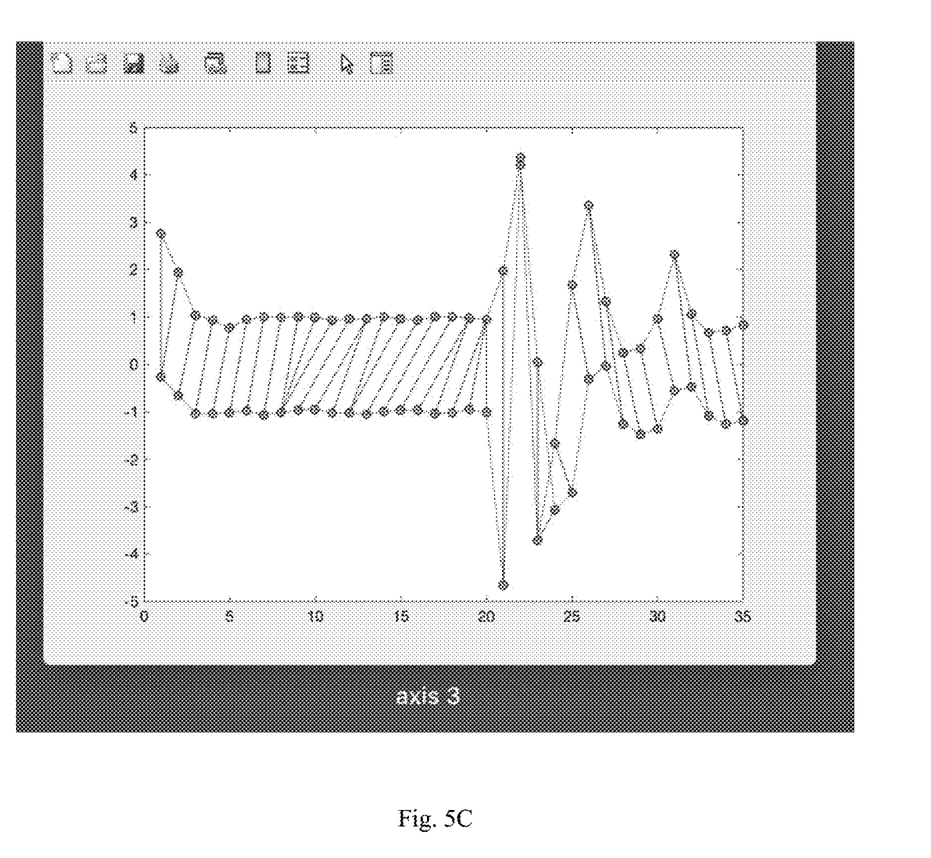
Figure 6A:
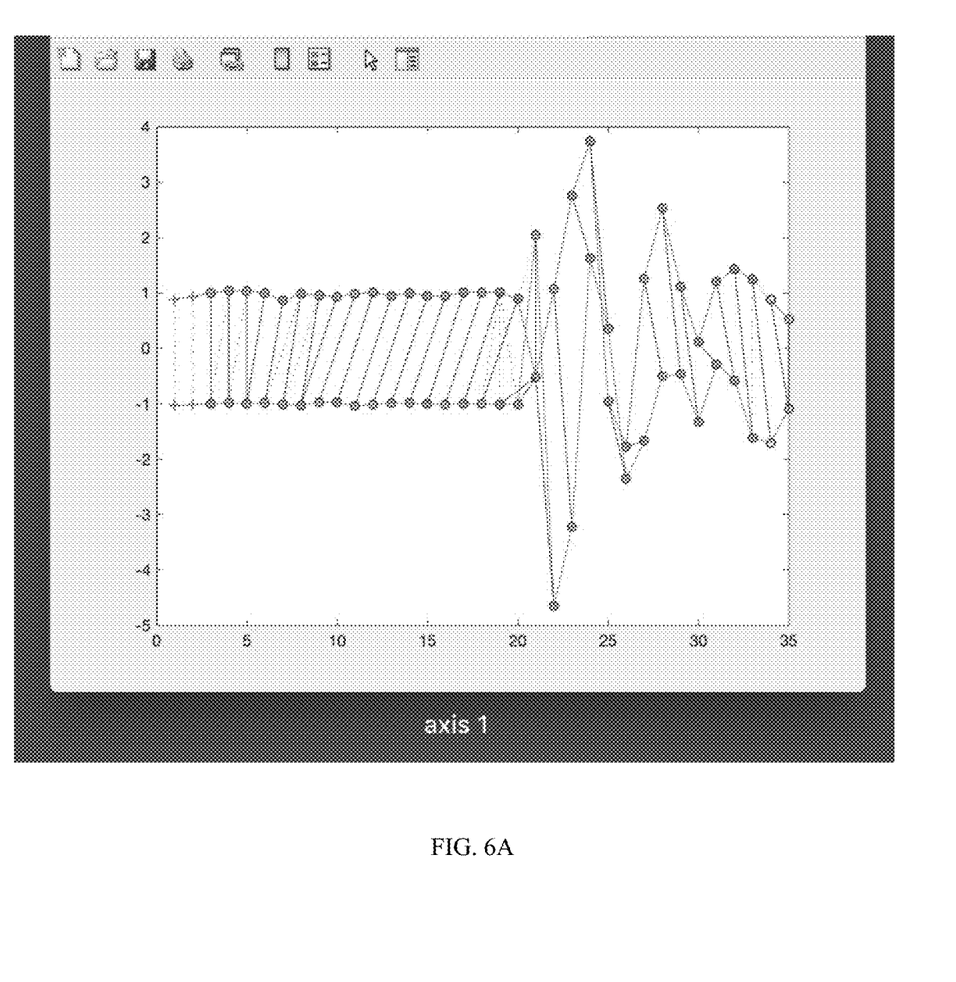
FIGS. 6A-6C are a signal matching result of an improved dynamic time warping algorithm performed in units of frame according to the present disclosure (the frame shift is 1 and the frame length is 3).
Figure 6B:
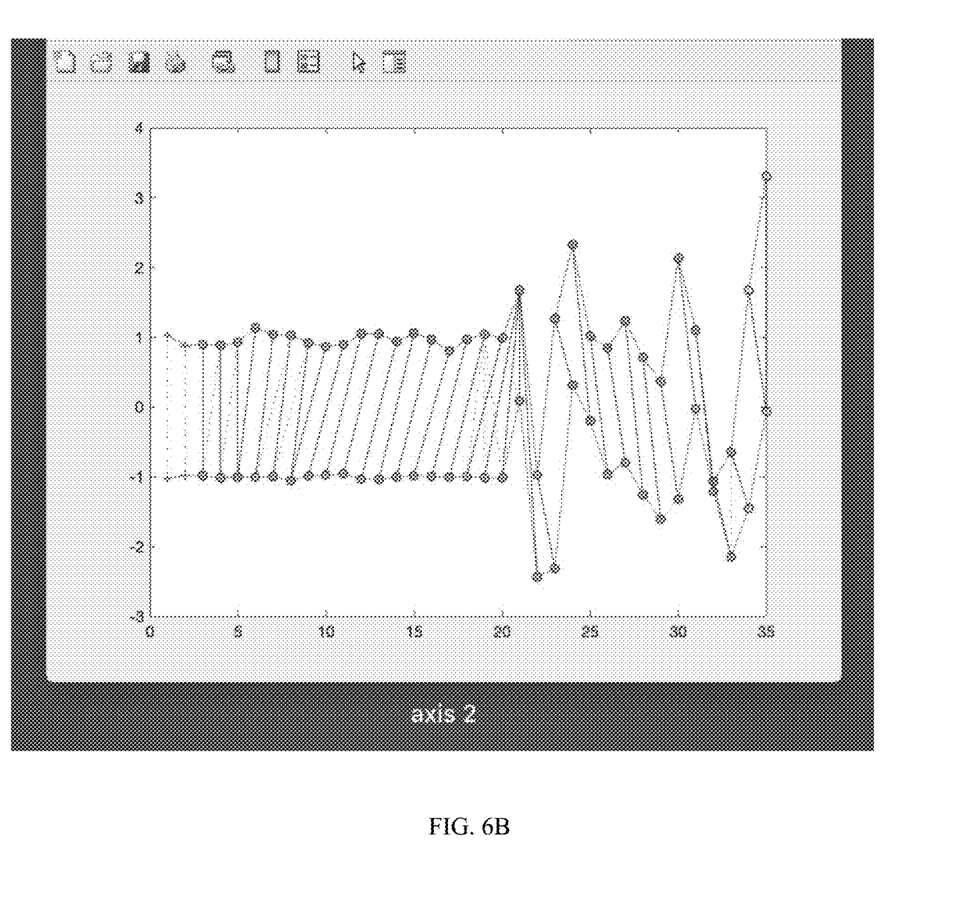
Figure 6C:
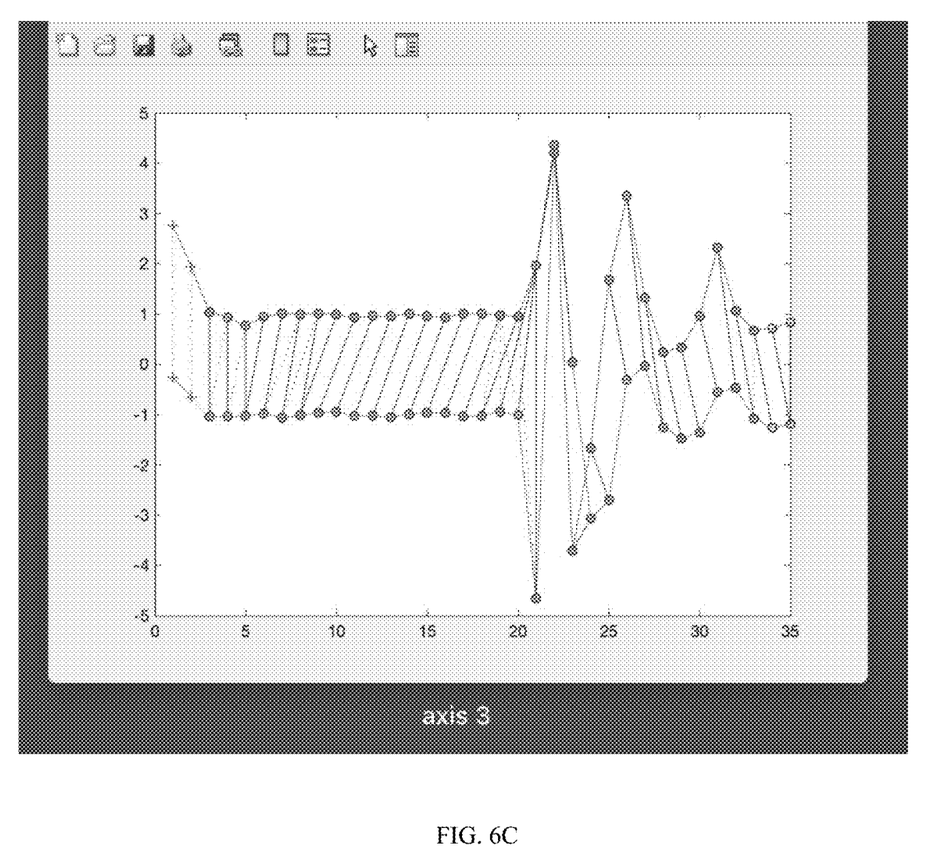

FIG. 5 shows a signal matching result of the original dynamic time warping algorithm of the present disclosure; and FIG. 6 shows a signal matching result of an improved dynamic time warping algorithm in units of frame according to the present disclosure (the frame shift is 1 and the frame length is 3). As is seen in FIG. 5 and FIG. 6, the signal matching mode does change after adding the constraints of the frame length and the frame shift in the dynamic time warping algorithm.

Figure 3:
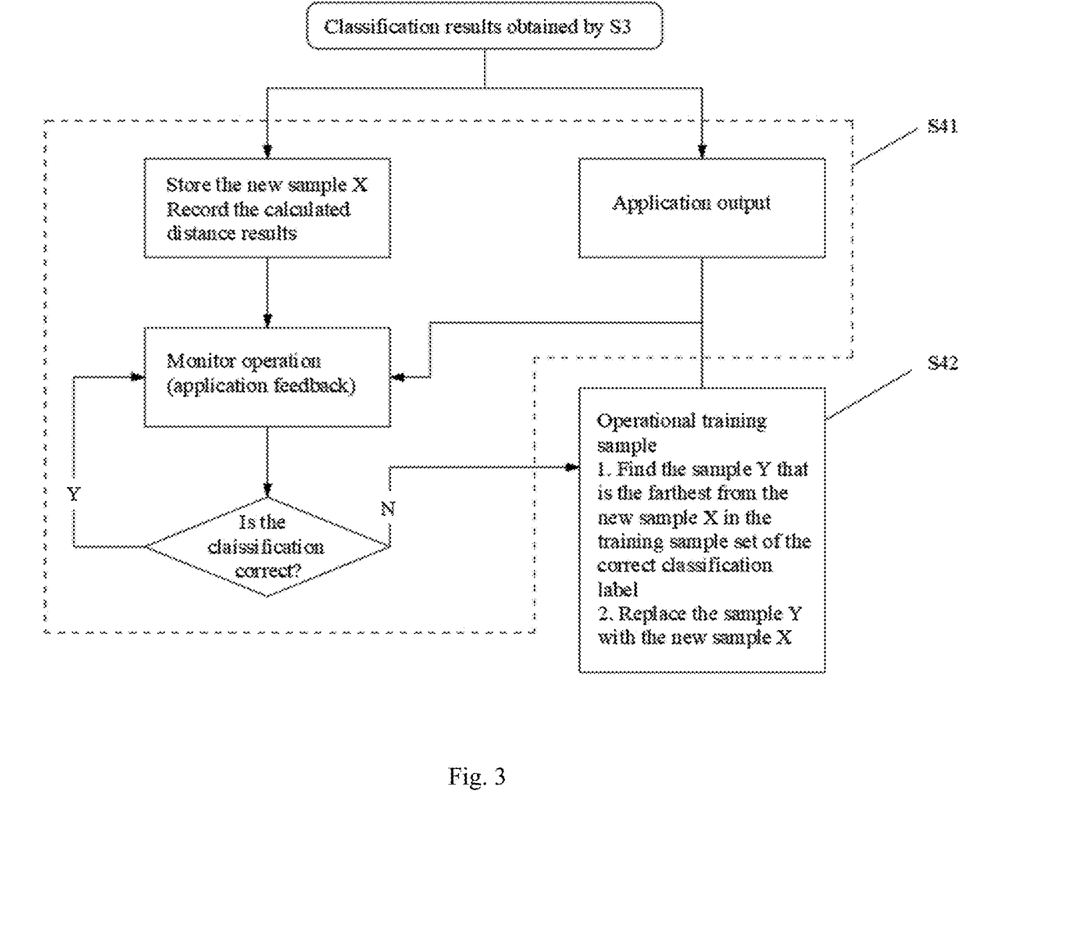
FIG. 3 is an operation flow chart of a feedback system of the present disclosure.

As shown in FIG. 3, in the step S4 of the embodiment, after the classification result is obtained in step S2, the result is output to the application program. In the meanwhile, the distance between the new sample X and the training sample obtained by the algorithm in the step S3 is recorded, and the feedback of the application program is monitored. After the feedback on the classification result is received, the training sample is operated according to the established sample replacement strategy, thereby obtaining a higher robustness. Specifically, after the classification result obtained in step S32 is collected, the input result of the user is corrected, wherein the classification and identification result is corrected by a candidate key or a correlation result in the input method; after correction, the training samples are modified to a certain extent to keep the accuracy stable, wherein if the corrected result is identical to the classification result, no operation is performed; if the correction result is not identical to the classification result, for the sample having the same category as the classification result in the training samples, the sample with the largest distance calculated by the improved algorithm of the k-nearest neighbor algorithm is deleted, and then the position of the deleted sample is replaced by the corrected training sample.

Figure 4:
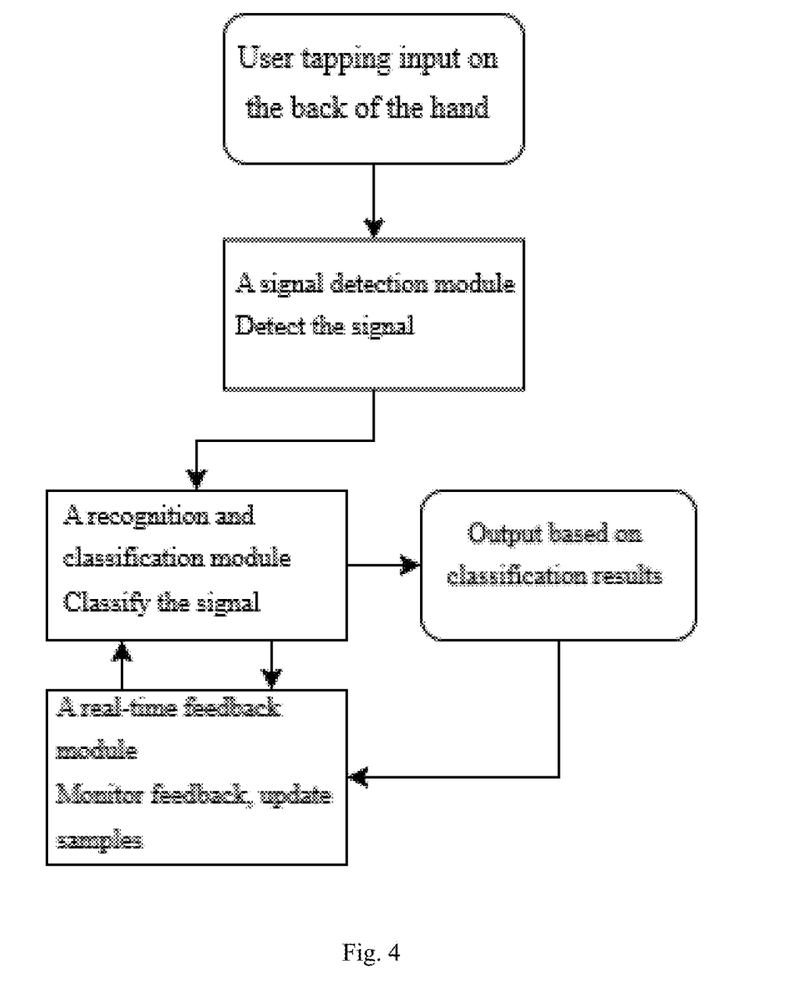
FIG. 4 is a schematic structural diagram of the present disclosure.

As shown in FIG. 4, the structure of the specific implementation of this embodiment includes three modules, namely a signal detection module, an identification and classification module, and a real-time feedback module. The signal detection module is configured to detect the signal, and pre-process the signal by normalization after detecting the signal, wherein the mean value of the data is subtracted from the signal and then the signal is divided by the variance of the data, which is used as an input of the classification identification module. The training (initialization) phase of the classification and identification module is merely a signal storage operation. After the training is completed, in the use phase the classification and identification module is used to perform an improved classification algorithm. The classification results will be sent into the real-time feedback module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The above is a further detailed description of the present disclosure in combination with specific/preferred embodiments, which forms no limit to the specific embodiments of the present disclosure. The ordinary person skilled in the technical field of the present disclosure can make various alternatives or modifications to the described embodiments within the conception of the present disclosure, and these alternatives or modifications should be regarded as falling within the protection scope of the present disclosure.

What is claimed is:

1. An interactive method of a smart watch, comprising steps of:
    acquiring a vibration signal of an accelerometer and a gyroscope of a smart watch based on a vibration signal transmitted by a human body, wherein the vibration signal of X, Y, and Z axes of the accelerometer and the gyroscope are separately collected;
    identifying the vibration signal by using an anomaly detection algorithm;
    pre-processing the vibration signal, and further classifying and identifying the vibration signal by using an improved algorithm of a k-nearest neighbor algorithm;
    analyzing a feedback of a user on classification and identification results and correcting the classification and identification results in time to keep an identification accuracy stable;
    wherein the step of identifying the vibration signal by using an anomaly detection algorithm comprises the following steps of:
    collecting data of a Z axis of the accelerometer;
    filtering the data of the Z axis of the accelerometer by using a high-pass filter;
    setting a threshold of an effective tapping signal and a threshold of a noise signal;
    reading a signal having a smaller amplitude than the threshold of the noise signal as a first state;
    continuing monitoring, waiting to read a signal having a larger amplitude than the threshold of the effective tapping signal, setting a position of the signal having the larger amplitude than the threshold of the effective tapping signal to be X, and setting a starting position of a signal to be X-L, namely, a position at a length L before the position X;
    continuing monitoring, waiting to read a continuous signal having a smaller amplitude than the threshold of the noise signal, and setting an end position of a signal as a current position when a continuous amplitude is smaller than the threshold of the noise signal;
    obtaining the signal through the starting position and the end position of a signal, judging whether a length of a signal is within a length range, and if the length of a signal is not within a length range, returning to the step of continuing monitoring, waiting to read the signal having the larger amplitude than the threshold of the effective tapping signal, setting the position of the signal having the larger amplitude than the threshold of the effective tapping signal to be X, and setting the starting position of a signal to be X-L, namely, the position at the length L before the position X; otherwise, proceeding to the next step;
    performing a high-pass filtering on the signal, calculating energy of first m points and energy of points after a $m^{th}$ point of the signal after filtering respectively, judging whether an amplitude of the signal is greater than a threshold of a signal-to-noise ratio, if the amplitude of the signal is greater than the threshold of the signal-to-noise ratio, determining a signal as a valid signal, otherwise determining a signal as the noise signal, and returning to the step of continuing monitoring, waiting to read the signal having the larger amplitude than the threshold of the effective tapping signal, setting the position of the signal having the larger amplitude than the threshold of the effective tapping signal to be X, and setting the starting position of the signal to be X-L, namely, the position at the length L before the position X.

2. The interactive method of the smart watch of claim 1, wherein the step of pre-processing the vibration signal, and further classifying and identifying the vibration signal by using the improved algorithm of the k-nearest neighbor algorithm comprises the following steps:
pre-processing the signal by normalization, subtracting a mean value from the signal and dividing the signal by a variance;
in the initialization training model phase, storing the signal processed in the step of pre-processing the signal by normalization, subtracting the mean value from the signal and dividing the signal by the variance as a training sample in a database; in the actual use phase, classifying and identifying the signal by using the improved algorithm based on the k-nearest neighbor algorithm.

3. The interactive method of the smart watch of claim 1, wherein the improved algorithm of the k-nearest neighbor algorithm comprises: based on a dynamic time warping algorithm, matching an actual signal and a training signal in units of frame, and calculating a shortest distance between the actual signal and the training signal, and using the shortest distance as a basis for the k-nearest neighbor algorithm for classification and identification.

4. The interactive method of the smart watch of claim 3, wherein the shortest distance is a Manhattan distance or an Euler distance.

5. The interactive method of the smart watch of claim 2, wherein the step of analyzing the feedback of the user on the classification and identification results and correcting the classification and identification results in time to keep the identification accuracy stable includes the following steps of:
after collecting the classification results obtained in the step of in the initialization training model phase, storing the signal processed in the step of pre-processing the signal by normalization, subtracting the mean value from the signal and dividing the signal by the variance as the training sample in the database; in the actual use phase, classifying and identifying the signal by using the improved algorithm based on the k-nearest neighbor algorithm, correcting an input result of the user;
after correction, correcting the training sample to keep the identification accuracy stable.

6. The interactive method of the smart watch of claim 5, wherein, the classification and identification result in the step of in the initialization training model phase, storing the signal processed in the step of pre-processing the signal by normalization, subtracting the mean value from the signal and dividing the signal by the variance as the training sample in the database; in the actual use phase, classifying and identifying the signal by using the improved algorithm based on the k-nearest neighbor algorithm is corrected by providing a candidate key or by a correlation result in the input method.

7. The interactive method of the smart watch of claim 6, wherein the step of after the correction, correcting the training sample to keep the identification accuracy stable specifically includes the following steps:
when a correction result is identical to a classification result, performing no operation;
when the correction result is not identical to the classification result, for a sample having the same category as the classification result in the training sample, deleting a sample having a largest distance calculated by the improved algorithm of the k-nearest neighbor algorithm, and replacing a deleted sample with a corrected training sample.

8. An interactive system of a smart watch, comprising:
a signal detection module, configured to acquire a vibration signal of an accelerometer and a gyroscope of a smart watch based on a vibration signal transmitted by a human body, wherein the vibration signal of X, Y, and Z axes of the accelerometer and the gyroscope are separately collected;
an identification and classification module, configured to identify the vibration signal by using an anomaly detection algorithm, to pre-processing the vibration signal, and to further classify and identify the vibration signal by using an improved k-nearest neighbor algorithm;
a real-time feedback module, configured to analyze a feedback of a user on results and correct the results in time to keep an identification accuracy stable;
wherein the identification and classification module perform the following steps of:
collecting data of a Z axis of the accelerometer;
filtering the data of the Z axis of the accelerometer by using a high-pass filter;
setting a threshold of an effective tapping signal and a threshold of a noise signal;
reading a signal having a smaller amplitude than the threshold of the noise signal as a first state;
continuing monitoring, waiting to read a signal having a larger ampituder than the threshold of the effective tapping signal, setting a position of the signal having the larger amplitude than the threshold of the effective tapping signal to be X, and setting a starting position of a signal to be X-L, namely, a position at a length L before the position X;
continuing monitoring, waiting to read a continuous signal having a smaller amplitude than the threshold of the noise signal, and setting an end position of a signal as a current position when a continuous amplitude is smaller than the threshold of the noise signal;
obtaining the signal through the starting position and the end position of a signal, judging whether a length of a signal is within a length range, and if the length of a signal is not within a length range, returning to the step of continue monitoring, waiting to read the signal having the larger amplitude than the threshold of the effective tapping signal, setting the position of the signal having the larger amplitude than the threshold of the effective tapping signal to be X, and setting the starting position of the signal to be X-L, namely, the position at the length L before the position X; otherwise, proceeding to the next step;
performing a high-pass filtering on the signal, calculating energy of first m points and energy of points after a $m^{th}$ point of the signal after filtering respectively, judging whether an amplitude of the signal is greater than a threshold of a signal-to-noise ratio, if the amplitude of the signal is greater than the threshold of the signal-to-noise ratio, determining a signal as a valid signal, otherwise determining a signal as the noise signal, and returning to the step of continuing monitoring, waiting to read the signal having the larger amplitude than the threshold of the effective tapping signal, setting the position of the signal having the larger amplitude than the threshold of the effective tapping signal to be X, and setting the starting position of the signal to be X-L, namely, the position at the length L before the position X.

9. A program stored on a non-transitory computer-readable medium, performing the interactive method of the smart watch according to claim 1.

10. The program according to claim 9, wherein the step of pre-processing the vibration signal, and further classifying and identifying the vibration signal by using the improved algorithm of the k-nearest neighbor algorithm comprises the following steps:
pre-processing the signal by normalization, subtracting a mean value from the signal and dividing the signal by a variance;
in the initialization training model phase, storing the signal processed in the step of pre-processing the signal by normalization, subtracting the mean value from the signal and dividing the signal by the variance as a training sample in a database; in the actual use phase, classifying and identifying the signal by using the improved algorithm based on the k-nearest neighbor algorithm.

11. The program according to claim 9, wherein the improved algorithm of the k-nearest neighbor algorithm comprises: based on a dynamic time warping algorithm, matching an actual signal and a training signal in units of frame, and calculating a shortest distance between the actual signal and the training signal, and using the shortest distance as a basis for the k-nearest neighbor algorithm for classification and identification.

12. The program according to claim 11, wherein the shortest distance is a Manhattan distance or an Euler distance.

13. The program according to claim 10, wherein the step of analyzing the feedback of the user on the classification and identification results and correcting the classification and identification results in time to keep the identification accuracy stable includes the following steps:
after collecting the classification results obtained in the step of in the initialization training model phase, storing the signal processed in the step of pre-processing the signal by normalization, subtracting the mean value from the signal and dividing the signal by the variance as the training sample in the database; in the actual use phase, classifying and identifying the signal by using the improved algorithm based on the k-nearest neighbor algorithm, correcting an input result of the user;
after correction, correcting the training sample to keep the identification accuracy stable.

14. The program according to claim 13, wherein, the classification and identification result in the step of in the initialization training model phase, storing the signal processed in the step of pre-processing the signal by normalization, subtracting the mean value from the signal and dividing the signal by the variance as the training sample in the database; in the actual use phase, classifying and identifying the signal by using the improved algorithm based on the k-nearest neighbor algorithm is corrected by providing a candidate key or by a correlation result in the input method.

15. The program according to claim 14, wherein the step of after the correction, correcting the training sample to keep the identification accuracy stable specifically includes the following steps:
when a correction result is identical to a classification result, performing no operation;
when the correction result is not identical to the classification result, for a sample having the same category as the classification result in the training sample, deleting a sample having a largest distance calculated by the improved algorithm of the k-nearest neighbor algorithm, and replacing a deleted sample with a corrected training sample.

* * * * *